Apr. 3, 1923.
L. S. BENDER
CREAM LIFTER
Filed July 11, 1922
1,450,789
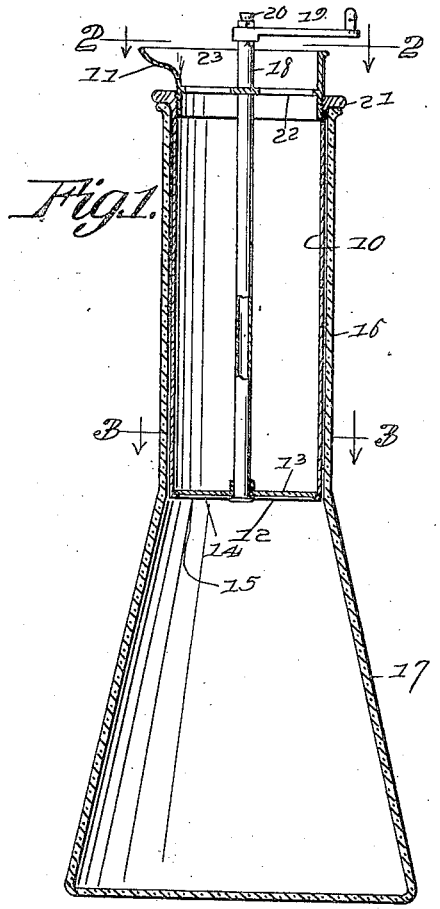
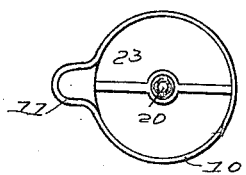
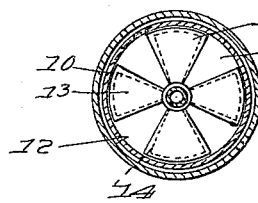
Inventor
L. S. Bender,
By
Attorney Patented Apr. 3, 1923.

1,450,789

UNITED STATES PATENT OFFICE.

LONNIE SHELDON BENDER, OF KANSAS CITY, MISSOURI.

CREAM LIFTER.

Application filed July 11, 1922. Serial No. 574,291.

*To all whom it may concern:*

Be it known that LONNIE SHELDON BENDER, a citizen of the United States of America, residing at Kansas City, in the county of Jackson and State of Missouri, has invented new and useful Improvements in Cream Lifters, of which the following is a specification.

The object of the invention is to provide a simple and efficient means for removing the cream top from milk bottles and like receptacles without disturbing the milk or lower body of the contents of the receptacle, as when it is desired to use the cream separately; and with this object in view the invention consists in a construction and combination of parts of which a preferred embodiment is shown in the accompanying drawings, wherein:—

Figure 1 is a sectional view of a cream separating device and receptacle in connection with which the same is used.

Figure 2 is a plan view of the lifting device with the crank omitted and viewed on a plane indicated by the line 2—2 of Figure 1.

Figure 3 is a transverse section on the plane indicated by the line 3—3 of Figure 1.

The device embodying the invention consists essentially of a barrel 10 of tubular or cylindrical form open at its upper end and provided preferably with a pouring lip 11 and provided at its lower end with a valve 12 consisting of a plurality of sector-shaped wings 13 for respectively covering sector-shaped openings 14 in the bottom 15 of the barrel so that with the valve open to expose said openings the device may be inserted into the neck 16 of the bottle or receptacle 17 to permit the cream to flow through the openings into the barrel. When the lower end of the barrel has been inserted to a depth sufficient to include all of the cream or as much thereof as it is desired to remove from the bottle the valve may be closed and the barrel withdrawn.

For the purpose of manipulating the valve it is provided with a stem 18 which may be fitted with a handle 19 which in the construction illustrated is in the form of a crank arm, and in order that the withdrawal of the barrel from the bottle neck after the cream has flowed thereinto, without producing suction and causing a disturbance of the contents remaining in the bottle proper, the stem 18 is preferably tubular to permit of the entrance therethrough of air to replace the liquid which is being withdrawn by means of the barrel.

Furthermore in order that the cream may not enter the bore of the stem while the barrel is being inserted into the bottle, a stopper such as a cork 20 should be removably fitted in the upper or outer end of the bore of the stem. This stopper may be removed when it is desired to withdraw the barrel from the bottle neck.

In order that the cream lifting or removing device may cooperate effectively with the bottle to the extent of removing substantially all of the cream which has accumulated by precipitation at the top of the liquid contents of the bottle, the latter is preferably provided with a special cylindrical neck as shown or with a neck which corresponds in cross-sectional form with the barrel and into which the barrel will fit snugly as indicated. The barrel may also be provided with an outwardly turned supporting flange 21 at its upper end to seat upon the lip of the bottle, and the upper portion of the valve operating spindle may be fitted in a bearing in a spider 22 formed in a collar 23 forming a part of the barrel in operation but constituting a feature separable from the body portion of the barrel to facilitate the cleansing and sterilization of the parts of the apparatus.

Having described the invention, what is claimed as new and useful is:—

1. A cream lifting and removing device for milk bottles having a barrel for introduction into the neck of the bottle in close relation with the side wall of the same, a cream inlet valve provided at the lower end of the barrel and a tubular stem extending axially through the barrel and operatively connected with the valve to provide for the actuation of the same and to admit air to the bottle to preclude suction in the same as the barrel is being removed.

2. A cream lifting and removing device for milk bottles consisting of a barrel for introduction into the neck of the bottle, and provided at its lower end with a radial valve having sector-shaped wings closing corresponding openings in the lower end of the barrel, a collar removably fitted in the barrel at the upper end of the latter and formed with a pouring mouth and with a spider, and a spindle connected at its lower end with the valve and journalled in a bearing formed in said spider, the spindle having an actuating handle by means of which it and the valve may be turned.

In testimony whereof he affixes his signature.

LONNIE SHELDON BENDER.